United States Patent [19]
Sigmon

[11] 3,977,648
[45] Aug. 31, 1976

[54] ROTARY MOTION VALVE AND ACTUATOR

[75] Inventor: James W. Sigmon, Charlotte, N.C.

[73] Assignee: Sigmon Corporation, Charlotte, N.C.

[22] Filed: June 27, 1974

[21] Appl. No.: 483,829

Related U.S. Application Data

[63] Continuation-in-part of Ser. No. 358,169, May 7, 1973, abandoned.

[52] U.S. Cl. .................................. 251/59; 91/383; 92/39; 92/121
[51] Int. Cl.² .................... F16J 3/04; F16K 31/126
[58] Field of Search ................ 92/39, 121; 251/59; 91/383, 376 A

[56] References Cited
UNITED STATES PATENTS

| | | | |
|---|---|---|---|
| 2,054,258 | 9/1936 | Kinzie | 251/59 X |
| 2,616,448 | 11/1952 | Werey | 251/59 X |
| 3,051,143 | 8/1962 | Nee | 92/121 X |
| 3,155,019 | 11/1964 | Stiguc et al. | 92/39 |
| 3,495,502 | 2/1970 | Bousso | 92/39 |
| 3,680,982 | 8/1972 | Jacobellis | 92/121 |
| 3,804,364 | 4/1974 | DeLepeleire | 251/43 |

Primary Examiner—Arnold Rosenthal
Attorney, Agent, or Firm—Bell, Seltzer, Park & Gibson

[57] ABSTRACT

A valve in which a valve member is mounted for rotary valving motion within a valve casing and an actuator in which at least one pair of expansible bellows engaging opposite sides of a vane and acting in opposition one to the other give rise to rotary motion. The bellows preferably are free from any direct fixation to the vane or the like, and have a particular configuration as described.

7 Claims, 13 Drawing Figures

U.S. Patent    Aug. 31, 1976    Sheet 1 of 2    3,977,648
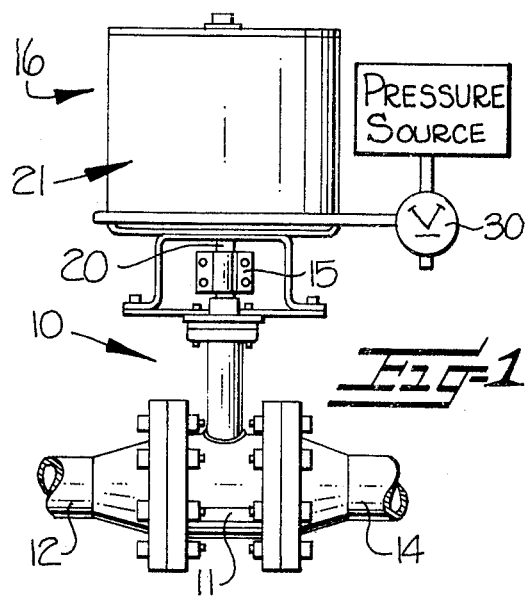
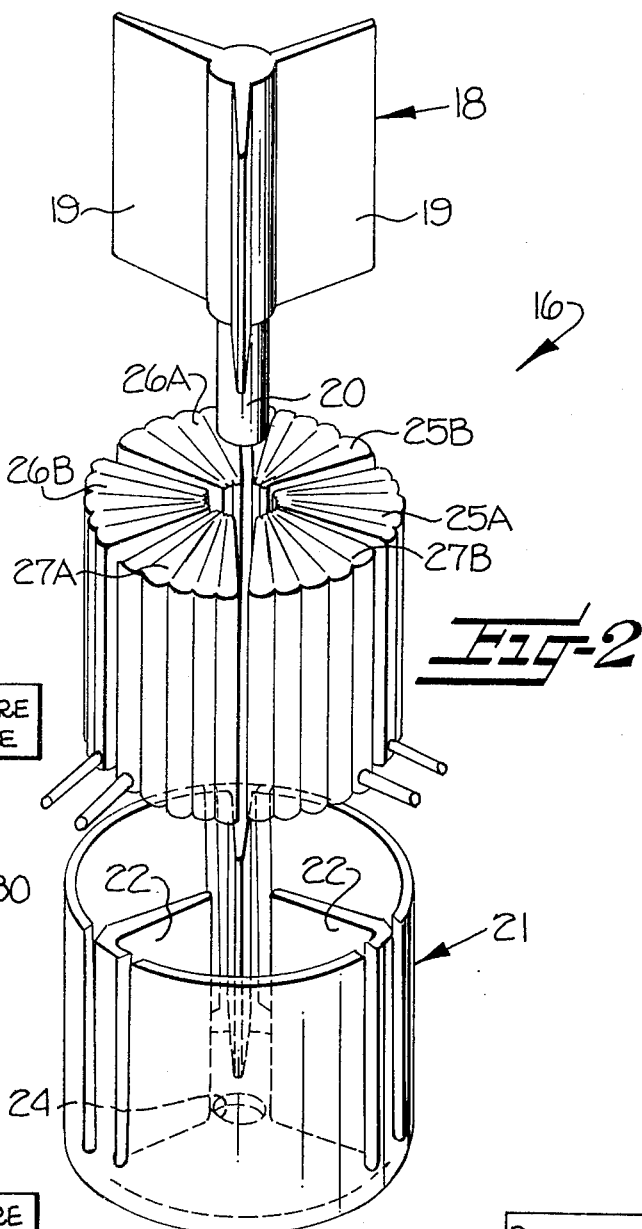
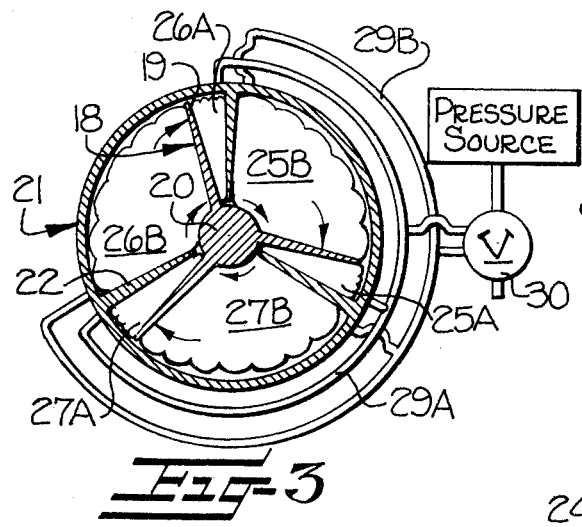
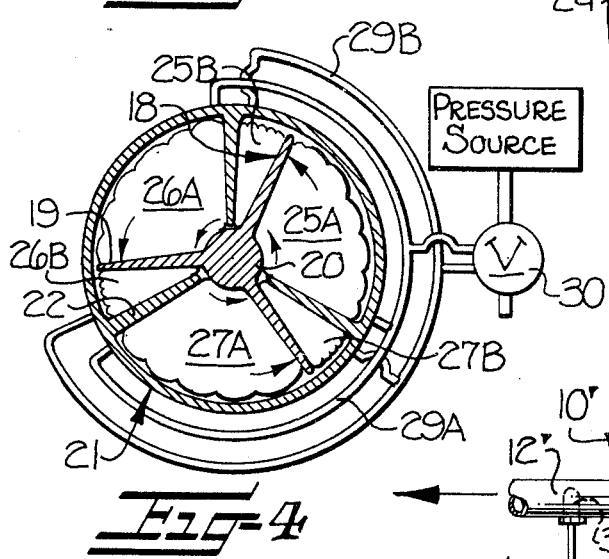
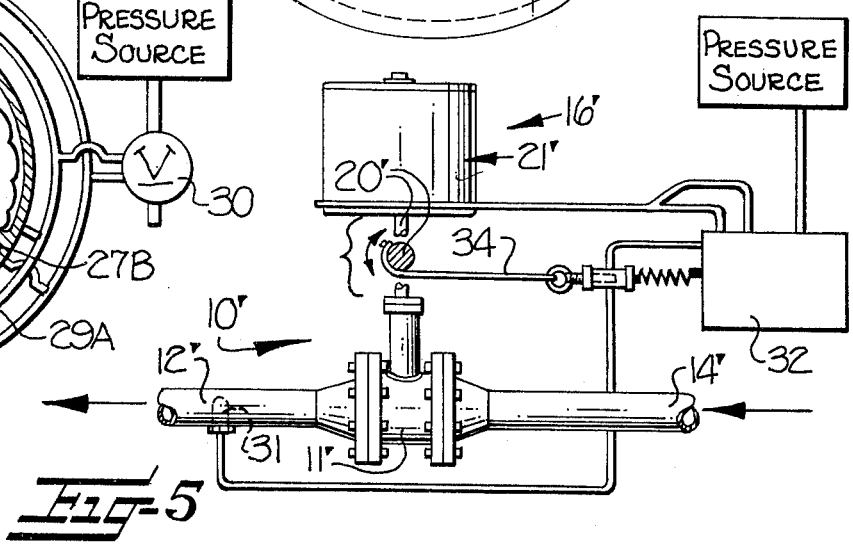

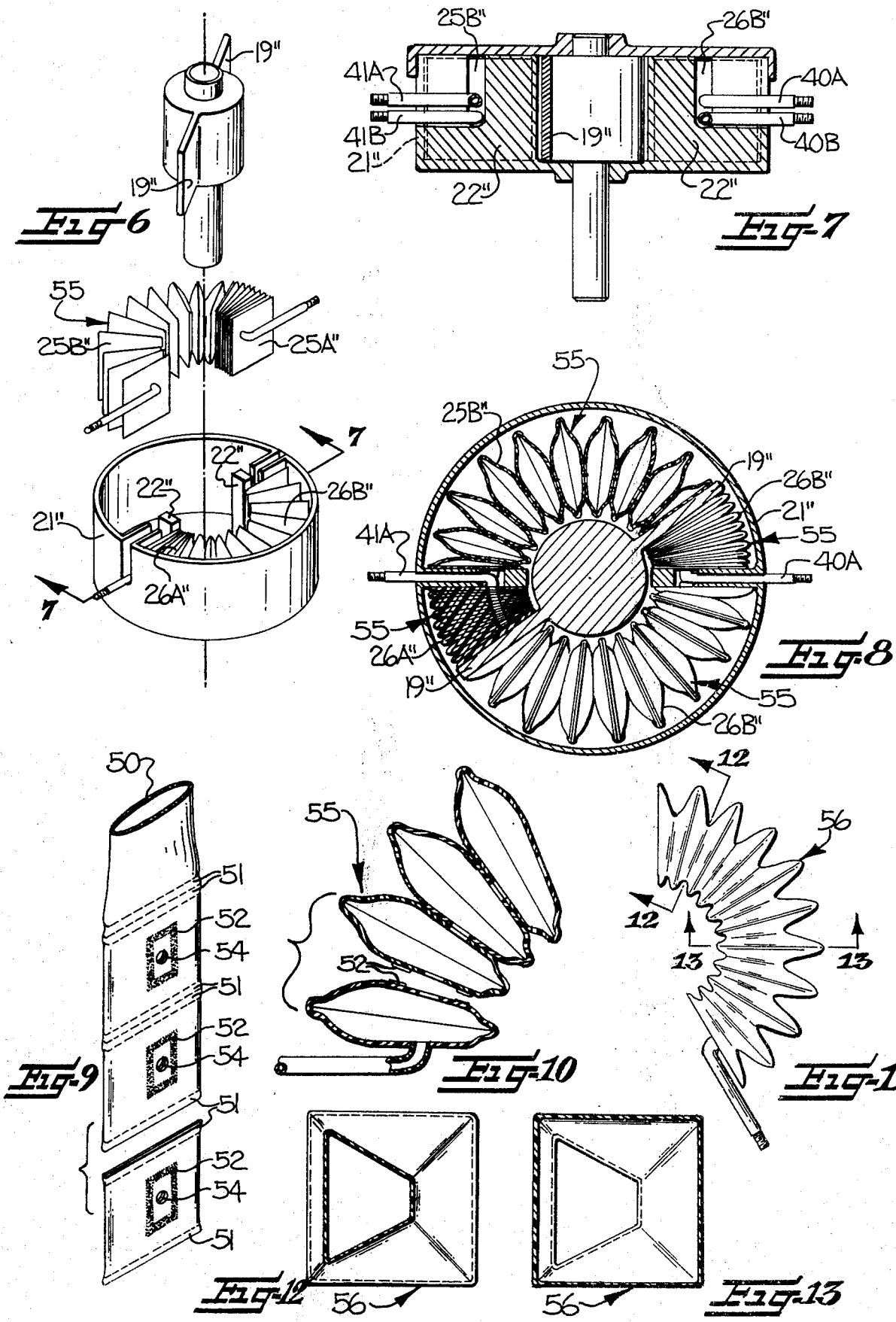

ROTARY MOTION VALVE AND ACTUATOR

This application is a continuation-in-part of copending application Ser. No. 358,169, now abandoned filed May 7, 1973, entitled ROTARY MOTION VALVE AND ACTUATOR.

It has been proposed heretofore that a pressurized actuating fluid be employed in developing controlled rotary motion for various controlled functions. One example of the use of such rotary motion is in controlling fluid flow through valves such as butterfly, plug or ball valves. In such arrangements as have been heretofore proposed, difficulty in assuring accurate control has been encountered due to leakage of the pressurized actuating fluid. In particular, many such rotary motion actuators which have been proposed have employed rotating vanes ostensibly sealed against a cylindrical inner wall of an enclosing housing. Often, the seals employed for the rotary vanes have unacceptably brief operating lives under the conditions encountered and quickly result in excessive leakage of pressurized actuating fluid and inaccurate positioning control.

Having in mind the aforementioned difficulties of prior arrangements, it is an object of the present invention to preclude excessive leakage of pressurized actuating fluid used in a rotary motion actuator and a rotary motion valve of the type described while facilitating application of actuating force along a curved or arcuate path. In realizing this object of the present invention, rotary motion is achieved by distribution of actuating fluid under pressure to bellows means which, when pressurized, expand along arcuate or curvalinear paths of movement. In accordance with this invention, the bellows means are interposed between reaction members and vanes in such a manner that an arcuately directed force arises between the reaction members and the vanes urging one of the members to rotate relative to the other.

In accordance with a further object of this invention, long operating life and relatively simple repair are facilitated by the free disposition of each of a plurality of bellows means between corresponding ones of a plurality of reaction members and a plurality of vanes. Such loose and free positioning of each of the bellows means facilitates use of bellows means fabricated from flexible sheet materials having substantial dimensional stability in the plane of the sheet and permits minor shifting of the bellows in accommodation of varying circumstances of use.

Some of the objects of the invention having been stated, other objects will appear as the description proceeds, when taken in connection with the accompanying drawings, in which FIG. 1 is an elevation view, partially schematic, illustrating a rotary motion valve in accordance with this invention;

FIG. 2 is an exploded perspective view of a rotary motion actuator incorporated in the valve of FIG. 1;

FIG. 3 is a plan view, partly in section and partly schematic, through the rotary motion actuator of FIG. 2;

FIG. 4 is a view similar to FIG. 3;

FIG. 5 is a view similar to FIG. 1 showing an application of the present invention to a closed loop control arrangement;

FIG. 6 is an exploded perspective view of a rotary motion actuator in accordance with this invention, similar to the actuator of FIG. 2;

FIG. 7 is an elevation view, in section, through the assembled actuator of FIG. 6, taken generally along the line 7—7 in that figure;

FIG. 8 is a plan view, partially in section, of the actuator of FIGS. 6 and 7;

FIG. 9 is a perspective view of one manner of fabricating a bellows used in the actuator of this invention;

FIG. 10 is a plan view similar to FIG. 8 of a bellows fabricated in accordance with the manner illustrated in FIG. 9;

FIG. 11 is a view similar to FIG. 10 of another form of bellows in accordance with this invention;

FIG. 12 is an elevation view, partially in section, through the bellows of FIG. 11, taken generally along the line 12—12 in that figure; and FIG. 13 is a view similar to FIG. 12, taken generally along the line 13—13 in FIG. 11.

While the rotary motion actuator and rotary motion valve of this invention will be described hereinafter with particular reference to the accompanying drawings, it is to be understood at the outset that the drawings and the following description are intended for illustrative purposes only. While the best form for this invention contemplated at the time this description is prepared will be illustrated and described, it is contemplated that this invention may have utility apart from the specific arrangements to which reference will be made. Accordingly, the following description is to be taken broadly and not as restricting the applicability of this invention.

Referring now more particularly to the drawings, a rotary motion valve in accordance with this invention is there indicated generally at 10 and includes a valve casing means 11 interposed between two portions 12, 14 of a fluid flow conduit for directing fluid flow therebetween. Within the valve casing means 11 is mounted a valve member means (not specifically illustrated) capable of rotary valving motion within the casing for controlling fluid flow therethrough. The valve member means may take a variety of specific forms as disclosed more fully in prior patents showing other rotary motion valves. In accordance with generally conventional practice, the valve member includes a stem portion by which the valve member is mounted for rotary motion and which extends from the casing 11 to be coupled by an appropriate coupling 15 to a rotary motion actuator as described more fully hereinafter.

In accordance with this invention, the rotary motion actuator generally indicated at 16 comprises a first actuator means 18 defining a central longitudinal axis and at least one vane 19 extending radially outwardly from such axis. In the specific form illustrated in FIGS. 2–4, the first actuator means 18 has three vanes 19 extending outwardly from a central member 20 which is coupled to the valve stem by the connector 15 described hereinabove.

A second actuator means generally indicated at 21 encircles the first actuator means 18 and defines at least one reaction member 22 extending radially inwardly toward the central longitudinal axis. In the specific form illustrated in FIGS. 2–4, the second actuator means 21 takes the form of a generally cylindrical housing or casing which has an opening 24 therein through which the central portion 20 of the first acutator means 18 extends.

As will be understood, one of the first and second actuator means 18, 21 is operatively connected with the valve member for transmitting rotation thereto, with the other of the first and second actuator means being fixed relative to the valve casing 11. In the form illustrated, it is the first actuator means 18 which is connected to transmit rotation, while the second actuator means 21 is fixed relative to the valve casing 11.

Bellows means are provided for exerting between the vanes 19 and reaction members 22 forces which rotate the first actuator means 18. In accordance with this invention, the bellows means includes pairs of expansible bellows engaging opposite sides of each vane and acting in opposition one to the other. Such pairs of bellows are indicated in the drawings at 25A, 25B, 26A, 26B, and 27A, 27B. By way of example (and as illustrated in FIGS. 2–4), the pair of opposing bellows 25A and 25B are disposed between a pair of adjacent reaction members 22 and have a corresponding vane 19 disposed between the bellows.

In order to impart rotary motion to the valve member, fluid pressure means are provided for distributing an actuating fluid under pressure to first one and then the other of alternate series of bellows. That is, an appropriate fluid under pressure (such as compressed air) is delivered from a pressure source to the bellows 25B, 26B and 27B through a distribution conduit 29B and by way of suitable connections as described hereinafter or as devised by persons knowing of other disclosures of such bellows. Preferably, such distribution is accomplished by means of a valve 30 which simultaneously vents the distribution conduit 29A to atmospheric pressure. As a result, the bellows 25B, 26B, and 27B expand and rotate the first actuator means 18 clockwise (in FIG. 3). A reversal of pressure fluid distribution (as would be accomplished by a four way valve) results in counterclockwise motion (FIG. 4).

In accordance with an important feature of this invention, each of the bellows 25A, 25B, 26A, 26B, 27A, and 27B is loosely inserted into the appropriate assembled relation with the first and second actuator means 18, 21 and is free to assume whatever position of engagement therewith as is appropriate to the stresses of operation of the rotary motion actuator and valve. It has been determined that such free floating positioning of the bellows elements favors long operating life for the apparatus of this invention and additionally facilitates ease of repair in the event that any individual bellows should for any reason or in any manner become punctured.

To this point, the present invention has been described in reference to an arrangement employing a valve 30 to control the distribution of the actuating fluid under pressure. It is contemplated that the arrangement of this invention may be employed in connection with a closed loop control system, as is schematically illustrated in FIG. 5 in which prime notation has been added to reference characters used in common with FIGS. 1–4. As there illustrated, a condition sensor 31 (or similar device) provides a signal indicative of a flow condition, which signal is supplied to positioner control 32. The rotational position of the valve stem is also provided to the positioner control 32 through an input leakage 34. By comparison of the position of the valve stem and the signal derived from the sensed condition, the positioner control 32 develops an error signal which is applied to the bellows means in determining the position of the valve stem and thus the flow conditions downstream of the rotary motion valve.

In accordance with important features of this invention, each of the bellows is formed by a series of wedge portions as visible in FIG. 2 and, upon expansion and contraction, moves along an arcuate or curvalinear path. Such characteristics of the bellows are more particularly illustrated in FIGS. 6–13, where the bellows are shown to be formed of flexible sheet material having substantial dimensional stability in the plane of the sheet. One such sheet material is polyethylene plastic film, while another suitable material is impregnated woven textile fabric. Other comparable materials will be identifiable by persons skilled in the art of fabricating sheet materials.

As herein used, the term "flexible" as applied to the sheet material of a bellows refers to the fact that the material may be displaced from the principle plane of the sheet material but is not intended to convey that the material has significant elasticity or stretchability. The term "substantial dimensional stability" is intended to clarify the relative inelastic characteristic of the material, particularly as shown by resistance of the material to stretching in the plane of the sheet when forces are applied perpendicularly to that plane.

While the wedge portions by which each of the bellows 25A, 25B, 26A, 26B, 27A, 27B are formed are generally visible in FIG. 2, that characteristic of bellows in accordance with this invention is better illustrated in the actuator shown in FIGS. 6–8. In that figure, elements corresponding to those identified in the description hereinabove have been identified by common reference characters, with the addition of double prime notation. Distinctions are to be noted in that the acutator arrangement of FIGS. 6–8 uses only two vanes 19″ and two reaction members 22″. The reaction members have hollow interiors to permit accommodation of bellows stems 40A, 40B, 41A, 41B by which fluid under pressure (such as compressed air) is delivered from a pressure source to the bellows 25A″, 25B″, 26A″, 26B″.

The wedge portions which form the bellows 25A″, 25B″, 26A″, 26B″ are defined by a plurality of envelopes, each of which has opposing generally rectangular walls joined together about the periphery of the envelope for containing actuating fluid therewithin while accommodating separation of the walls upon expansion of the bellows. In bellows formed by a series of envelopes, adjacent envelopes have minor areas of contacting walls thereof joined together at locations spaced from the center of the generally rectangular walls and the interiors of the adjacent envelopes communicate through the minor areas for flow of actuating fluid between the envelopes.

As will be understood, the displacement of the minor areas of contacting walls which are joined together from the center of the generally rectangular walls contributes to the bellows in accordance with this invention the important characteristic of expanding and contracting along curvalinear or arcuate paths of movement. The relative radius of the arcuate paths followed by the bellows in such expansion and contraction is controlled by the extent of such radial displacement of contacting areas.

Such controlled movement of the bellows along curvalinear or arcuate paths of movement provides two important characteristics for the apparatus of this invention. First, this characteristic avoids the necessity of providing lubricants such as grease within the chambers defined between the first and second actuator means, as is necessary with previously proposed forms of bellows where rubbing engagement between the walls of the actuating means and the bellows occurs. Second, this characteristic of the present invention assures avoidance of pinching of the walls of the bellows between the vanes 19'' and the interior wall surface of the second actuator means 21'', such as occurs with prior proposals incorporating bags or membranes of no determinate shape or configuration.

Fabrication of the bellows in accordance with the mode most preferred at the time this description is prepared facilitates achievement of these desired characteristics. In particular, it is preferred that the envelopes defining the wedge portions of the bellows 25A'', 25B'', 26A'', 26B'' be formed by opposing generally rectangular walls cut from a suitable flat sheet of material. By way of example, such walls may be cut to a square shape. A pair of the walls are then superposed and joined together about the periphery of the envelope by suitable stitching, fusing or adhering means. With the envelopes so formed, inflation of the envelope by admission of a pressure fluid thereinto will cause the walls to separate and draw in the peripheral edges at which the walls are joined, reducing the rectangular dimensions of the envelope. A series of such envelopes may then have communicating openings punched therethrough at a location spaced a predetermined distance from the center of the rectangular configuration, and minor areas of contacting walls of adjacent envelopes may be joined together in a manner similar to the joining of the peripheral edges to complete fabrication of the bellows.

While this is the preferred form for fabrication of bellows in accordance with this invention, the wedge portions characteristic of the bellows of this invention may be achieved in other manners as well. One such alternative form of bellows is illustrated in FIGS. 9 and 10, where it may be seen that a tubular material 50 is flattened and adhered together at spaced locations 51. By this means, an envelope is formed between two of the spaced, adhered together locations 51. The envelope thus formed has opposing generally rectangular walls which are joined together at two opposing sides by the folded tubular characteristic of the material 50 and at the alternate opposed sides by the stitched, fused or adhered together locations 51. Such envelopes may then be provided with minor areas 52 for adhesion and communication openings 54 within the minor areas, and joined together into a bellows generally indicated at 55 (FIG. 10).

Yet another alternative is illustrated in FIGS. 11–13, where a blow molded or folded bellows generally indicated at 56 has a series of wedge portions defined between minor cross-sectional planes (as indicated by the line 12—12) and major cross-sectional planes (as indicated by the line 13—13). The relative centers of the areas defined at the minor and major cross-sectional planes are displaced one from the other as will be noted by comparing FIGS. 12 and 13. This displacement of centers achieves the characteristics of movement along a curvalinear or arcuate path which are described hereinabove and which are of particular importance in connection with this invention.

In the drawings and specification, there has been set forth a preferred embodiment of the invention, and although specific terms are employed, they are used in a generic and descriptive sense only and not for purposes of limitation.

That which is claimed is:

1. A rotary motion valve comprising:
   valve casing means for directing fluid flow,
   valve member means mounted for rotary valving motion within said valve casing means and for controlling fluid flow therethrough,
   first actuator means defining a central longitudinal axis and at least one vane extending radially outwardly of said axis,
   second actuator means encircling said first actuator means and defining at least one reaction member extending radially inwardly toward said axis and a generally right circular cylindrical encircling surface concentric with said axis,
   one of said first second actuator means being operatively connected with said valve member for transmitting rotation thereto and the other of said first and second actuator means being fixed relative to said valve casing means,
   pressure containing means for exerting between said at least one vane and said at least one reaction member forces rotating said one actuator means relative to said other actuator means, said pressure containing means including at least one pair of force exerting bellows means for acting along respective arcuate lines in opposition one to the other,
   each of said bellows means being defined by a series of joined envelopes, each of said envelopes having walls of flexible sheet material having substantial dimensional stability in the plane of the sheet, said walls common to respective envelopes being joined together about the periphery of said envelopes for containing actuating fluid therewithin while accommodating separation of said walls upon expansion of said bellows means, adjoining walls of adjacent envelopes being joined together in minor areas centered about centers spaced from the centers of the peripheries of said adjacent envelopes, said envelopes communicating through said minor areas for distribution of actuating fluid through said bellows means, and said envelopes imparting to said bellows means an inherent tendency to form when expanded a segment of a solid of revolution,
   each of said bellows being loosely inserted between the corresponding said one vane and said one reaction member for freely assuming whatever position of engagement therewith and with said encircling surface as is appropriate to any stresses of operation, and
   fluid pressure means for distributing an actuating fluid under pressure to first one and then the other of said bellows means.

2. Apparatus according to claim 1 wherein said first actuator means defines a plurality of vanes and said second actuator means defines a number of reaction members corresponding to the number of said vanes, said first and second means being arranged with each of said reaction members being interposed between circumferentially adjacent ones of said vanes.

3. Apparatus according to claim 2, wherein said pressure containing means includes a plurality of pairs of bellows means with each pair engaging opposite sides of one of said vanes and acting in opposition one to the other between circumferentially adjacent ones of said reaction members.

4. Apparatus according to claim 1 wherein said second actuator means is fixed against rotation and said first actuator means rotates relative thereto.

5. A rotary motion actuator comprising:

first means defining a central longitudinal axis and at least two vanes extending radially outwardly of said axis and spaced one from another circumferentially thereabout, second means encircling said first means and defining a generally right circular cylindrical encircling surface concentric with said axis and a number of reaction members corresponding to the number of said vanes, each of said reaction members extending radially inwardly toward said axis and being interposed circumferentially adjacent ones of said vanes, one of said first and second means being supported for rotation about said axis relative to the other of said first and second means and said other means being fixed against rotation about said axis, a plurality of bellows means for acting along respective arcuate lines in opposition one to another and for exerting between said vanes and said reaction members forces rotating said one means, each of said bellows means being defined by a series of joined envelopes, each of said envelopes having walls of flexible sheet material having substantial dimensional stability in the plane of the sheet, said walls common to respective envelopes being joined together about the periphery of said envelopes for containing actuating fluid therewithin while accommodating separation of said walls upon expansion of said bellows means, adjoining walls of adjacent envelopes being joined together in minor areas centered about centers spaced from the centers of the peripheries of said adjacent envelopes, said envelopes communicating through said minor areas for distribution of actuating fluid through said bellows means, and said envelopes imparting to said bellows means an inherent tendency to form when expanded a segment of a solid of revolution, and being interposed between a reaction member and a vane so that each reaction member and each vane extends between an opposing pair of said bellows means, each of said bellows means being loosely inserted between a corresponding one said vane and one said reaction member for freely assuming whatever position of engagement therewith and with said encircling surface as is appropriate to any stresses of operation, and fluid pressure means for distributing an actuating fluid under pressure to circumferentially alternate ones of said bellows means.

6. Apparatus according to claim 5 wherein said fluid pressure means comprises a first pressure fluid conduit operatively communicating with said one expansible bellows means, a second fluid pressure conduit operatively communicating with said other expansible bellows means, and valve means for directing pressure fluid into a selected one of said first and second conduits while venting the other of said first and second conduits to atmospheric pressure.

7. Apparatus according to claim 6 wherein said valve means comprises means responsive to the rotational position of said one actuator means.

* * * * *

UNITED STATES PATENT OFFICE
CERTIFICATE OF CORRECTION

PATENT NO. : 3,977,648
DATED : August 31, 1976
INVENTOR(S) : James W. Sigmon

It is certified that error appears in the above-identified patent and that said Letters Patent are hereby corrected as shown below:

Column 6, Line 16 after "first" insert -- and --;
Column 6, Line 47 after "bellows" insert -- means --;
Column 7, Line 16 after "interposed" insert -- between --

Signed and Sealed this

Fourteenth Day of December 1976

[SEAL]

Attest:

RUTH C. MASON
Attesting Officer

C. MARSHALL DANN
Commissioner of Patents and Trademarks